(12) United States Patent
Bierhoff

(10) Patent No.: US 6,572,728 B1
(45) Date of Patent: Jun. 3, 2003

(54) METHOD OF MANUFACTURING A SCANNING DEVICE WITH ADJUSTABLE FRAMES

(75) Inventor: Waltherus C. J. Bierhoff, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 134 days.

(21) Appl. No.: 09/642,714

(22) Filed: Aug. 21, 2000

(30) Foreign Application Priority Data

Aug. 25, 1999 (EP) .............................. 99202753

(51) Int. Cl.$^7$ ............................................. B32B 31/00
(52) U.S. Cl. ................. 156/292; 369/44.32; 369/215
(58) Field of Search .................. 156/272.2, 275.5, 156/275.7, 292; 369/44, 32, 215, 219, 221, 244, 249, 258, 261, 263, 264, 270

(56) References Cited

U.S. PATENT DOCUMENTS

| 5,982,735 A | 11/1999 | Tsai ........................... 369/219 |
| 6,256,287 B1 * | 7/2001 | Baartman et al. ........... 369/244 |
| 6,388,982 B2 * | 5/2002 | Ogusu ........................ 369/258 |

FOREIGN PATENT DOCUMENTS

| CN | 1176453 A | 3/1998 | ............ G11B/7/08 |
| EP | 0892403 A1 | 1/1999 | ............ G11B/17/26 |

\* cited by examiner

*Primary Examiner*—Michael W. Ball
*Assistant Examiner*—Jessica Rossi
(74) *Attorney, Agent, or Firm*—Laurie E. Gathman

(57) ABSTRACT

The invention relates to a method of manufacturing a scanning device comprising a support (9) for an information carrier (1), a motor (13) for rotating the support about an axis of rotation (11), a scanning unit (15) for scanning the information carrier, and a displacement device (19) for displacing the scanning unit relatively to the information carrier. According to this method, the motor and the displacement unit are each provided on a separate frame (29, 31), and the scanning device is provided with a pretensioning means (39) and an adjusting device (33, 35, 37). In at least one adjustment position, the frames are held at a mutual distance under the influence of a pretensioning force exerted by said pretensioning means, said distance being adjusted by means of said adjusting device. The adjusting device is used to correct an angular deviation present between a laser beam path (27) of the scanning unit and a normal to an information surface (7) of the information carrier as a result of manufacturing tolerances. According to the method in accordance with the invention, an adhesive (73, 75) is applied between the two frames adjoining the adjusting device, and the distance between the two frames, as adjusted by means of the adjusting device, is secured by curing the adhesive present between the two frames. In this manner, unwanted mutual displacements of the two frames, which could occur as a result of imbalance forces caused by the information carrier rotating at relatively high speeds, are prevented as much as possible.

3 Claims, 3 Drawing Sheets

METHOD OF MANUFACTURING A SCANNING DEVICE WITH ADJUSTABLE FRAMES

BACKGROUND OF THE INVENTION

The invention relates to a method of manufacturing a scanning device comprising a support for an information carrier, a motor for rotating the support about an axis of rotation, a scanning unit for scanning the information carrier and a displacement device for displacing the scanning unit relatively to the information carrier, according to which method the motor and the displacement device are each provided on a separate frame, and the scanning device is provided with a pretensioning means and an adjusting device, both frames being maintained at a mutual distance in at least one adjustment position, viewed in a direction parallel to the axis of rotation, under the influence of a pretensiohing force of the pretensioning means, and said distance being adjusted by means of the adjusting device.

The invention also relates to a scanning device manufactured in accordance with a method according to the invention.

A method of the type mentioned in the opening paragraph is generally known and customary, and is used, for example, in the manufacture of an optical scanning device comprising an optical scanning unit for scanning an optically scannable information carrier, such as a CD or DVD, by means of a laser beam. Particularly in the case of optical scanning devices for scanning information carriers with a high information density, an angular deviation between a laser beam path of the scanning unit and a normal to an information surface of the information carrier should lie within relatively small limiting values. Such an angular deviation develops during the manufacture of the scanning device as a result of manufacturing tolerances. To correct said angular deviation in the course of the manufacturing process, i.e. after the assembly of the scanning device, said scanning device is provided, in accordance with the known method, with an adjusting device in three adjustment positions, said three adjustment positions being mutually triangularly arranged around the motor and the axis of rotation, viewed in a plane extending transversely to the axis of rotation. Each of said three adjusting devices comprises a screw which is screwed into a screw hole extending substantially parallel to the axis of rotation, which screw hole is provided in the frame on which the motor with the support is provided. The screw is provided with a head which, under the influence of the pretensioning force exerted by the pretensioning means, supports the frame on which the displacement device with the scanning unit is provided. By rotating the three screws, the frame on which the displacement device with the scanning unit is provided can be oriented with respect to the frame on which the motor with the support are provided, and hence an orientation of the laser beam path with respect to the support can be adjusted. In particular, the support can be tilted with respect to the laser beam path about two tilt axes extending perpendicularly to the axis of rotation, and the support can be displaced in a direction parallel to the axis of rotation. After the mutual orientation of the laser beam path and the support has been thus adjusted, the frames are held in position with respect to each other in that the frame of the displacement device rests, under the influence of the pretensioning force exerted by the pretensioning means, against the heads of the three screws screwed into the frame of the motor. In this manner, a necessary possibility of adjusting the orientation of the laser beam path with respect to the support is obtained in a very practical and simple manner, and the orientation of the laser beam path is very accurately adjustable with respect to the support.

A drawback of the known method resides in that both frames are not stably held in position with respect to each other under the influence of said pretensioning force, particularly in the case of scanning devices wherein information carriers, such as a CD-ROM or a DVD-ROM, are rotated about the axis of rotation at a relatively high speed. As a result of imbalance forces, which are generally caused, at such high speeds of rotation, by imbalance of the information carrier, mutual displacements of the two frames counter to said pretensioning force occur at the location of the adjusting devices, resulting in undesirable deviations of the orientation of the laser beam path with respect to the information carrier.

SUMMARY OF THE INVENTION

It is an object of the invention to provide a method of the type mentioned in the opening paragraph, by means of which the orientation of the laser beam path with respect to the support can also be readily and accurately adjusted, in the course of the manufacture of the scanning device, and by means of which also the above-mentioned drawback of the known method can be precluded as much as possible.

To achieve this object, a method in accordance with the invention is characterized in that an amount of an adhesive is provided between the two frames at a location near the adjusting device, the adjusted distance between the two frames being secured by curing the adhesive provided between the two frames. The adhesive is provided in uncured form between the two frames during the mutual assembly of the frames. Preferably, use is made of an adhesive which has a relatively long curing time or which can be cured in a controlled manner using, for example, UV-light, so that the uncured state of the adhesive is maintained during the assembly and adjustment of the orientation of the frames with respect to each other. By virtue thereof, the mutual orientation of the frames can be adjusted, after assembly, by means of the adjusting device in a relatively simple and accurate manner comparable to the known method wherein the still uncured adhesive is deformed between the frames. The adjusted mutual orientation of the frames is subsequently secured by curing the adhesive, resulting in a so-called constrained securing. It has been found that the mutual orientation of the frames is thus very stably secured, so that the above-mentioned mutual displacements of the two frames under the influence of imbalance forces are substantially completely precluded. By using the above-mentioned adhesive, said securing is thus obtained in a very simple, practical and efficient manner.

A particular embodiment of a method in accordance with the invention is characterized in that the amount of adhesive is provided in an interspace between the adjusting device and the pretensioning means. By providing the adhesive in said interspace, the adjusted mutual orientation of both frames is secured in a very stable manner. If the pretensioning means comprises a mechanical spring, a receiving space is formed between the mechanical spring and both frames, wherein excess adhesive is efficiently received during adjusting the mutual orientation of both frames.

A further embodiment of a method in accordance with the invention is characterized in that said distance is adjusted by rotating a screw of the adjusting device, which screw is screwed into a screw hole of a first one of the two frames, which screw hole extends substantially parallel to the axis of rotation, and which screw is provided with a head against which a second one of the two frames rests under the influence of the pretensioning force, a further amount of adhesive being provided in the screw hole, and the screw being secured, after adjusting said distance, in the screw hole by curing the adhesive provided in the screw hole. In this further embodiment of a method in accordance with the invention, between the two frames preferably a same type of adhesive is used as in the screw hole of the adjusting device. The adjusted mutual orientation of the two frames can thus be secured in a very simple manner because the provision of a quantity of adhesive between the two frames in addition to the provision of a quantity of adhesive of the same type in the screw hole requires relatively little time and effort.

A scanning device in accordance with the invention, which is manufactured in accordance with a method according to the invention, is characterized in that the scanning device is provided with an adjusting device in three adjustment positions, a first one and a third one of the adjusting devices being arranged, on a Y-axis, so as to be diametrically opposed, with respect to the axis of rotation, said Y-axis extending perpendicularly to the axis of rotation, and a second one of the adjusting devices being arranged on a X-axis extending perpendicularly to the axis of rotation and the Y-axis, while the first, the second and the third adjusting device are provided with, respectively, a first, a second and a third cylindrical guide sleeve, which are provided on the first frame and each comprise the screw hole of the relevant adjusting device, and with, respectively, a first, a second and a third cylindrical supporting element, which are provided on the second frame and are guided around, respectively, the first, the second and the third guide sleeve, the second frame resting against the heads of the screws of the three adjusting devices through the help of three supporting elements and under the influence of the pretensioning force. The cylindrical guide sleeves and the cylindrical supporting elements each have two functions, namely guiding the first frame with respect to the second frame during adjusting the mutual orientation of the two frames, and, respectively, supporting the screw holes of the adjusting devices and making the second frame bear against the heads of the screws of the adjusting devices, so that a very practical construction of the scanning device is obtained. Both frames can be mutually tilted about said Y-axis and said X-axis by a rotation of, respectively, the screw of the second adjusting device and the screws of the first and the third adjusting device. Both frames can be mutually displaced in a direction parallel to the axis of rotation by rotating the screws of each one of the three adjusting devices.

These and other aspects of the invention will be apparent from and elucidated with reference to the embodiments described hereinafter.

DETAILED DESCRIPTION OF THE PREFERRED EMBODIMENTS

Figure 1:
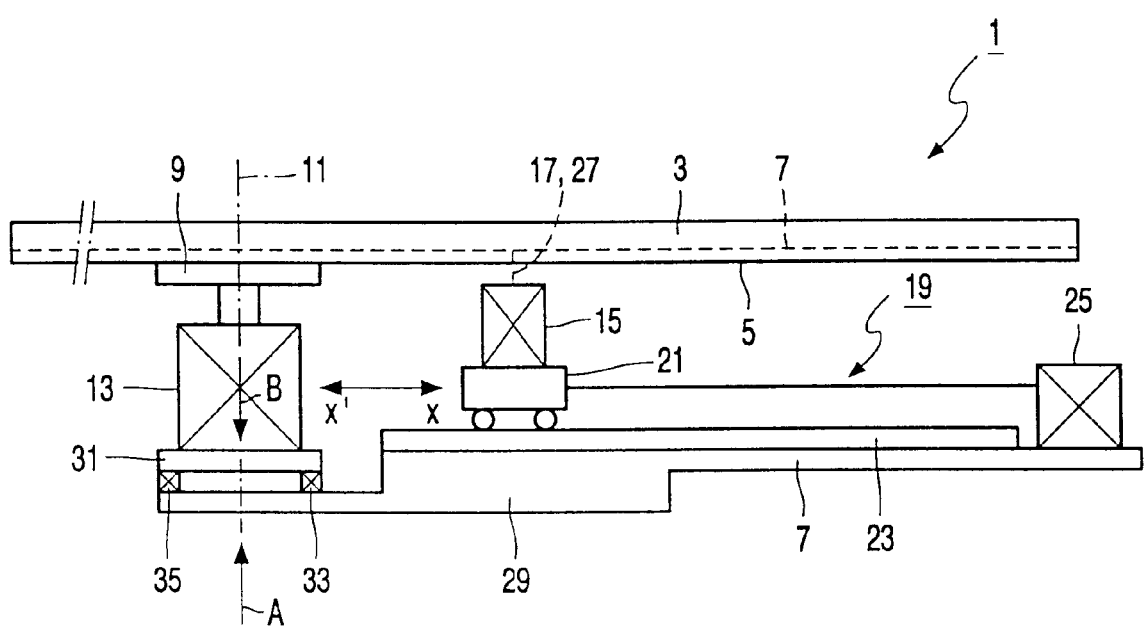
FIG. 1 diagrammatically shows a scanning device in accordance with the invention, which is manufactured according to a method in accordance with the invention.

The scanning device in accordance with the invention, as diagramatically shown in FIG. 1, is an optical scanning device which is manufactured in accordance with a method according to the invention and can be suitably used to scan an optically scannable disc-shaped information carrier 1, such as a CD or a DVD. The information carrier 1 comprises a disc-shaped support 3 and a transparent protective layer 5. A side of the carrier 3 adjoining the protective layer 5 forms an information layer 7 of the information carrier 1 on which a spiral-shaped information track is present. The scanning device comprises a support 9 for the information carrier 1, which can be rotated about an axis of rotation 11 and can be driven by an electric motor 13. The scanning device further includes an optical scanning unit 15 for scanning the information track of the information carrier 1 by means of a laser beam 17. The scanning unit 15 can be displaced, by means of a displacement device 19 of the scanning device, with respect to the support 9 and the information carrier 1 in two opposite directions X and X', which are directed substantially perpendicularly to the axis of rotation 11. For this purpose, the scanning unit 15 is attached to a slide 21 of the displacement device 19, which is further provided with a straight guide 23, which extends parallel to the X-direction, over which guide the slide 21 is displaceably guided, and with an electric motor 25 by means of which the slide 21 can be displaced over the guide 23. In operation, an electric control unit of the scanning device, which is not shown in the Figure, controls the motors 13 and 25 so as to cause the information carrier 1 to rotate about the axis of rotation and, simultaneously, the scanning unit 15 to be displaced in a direction parallel to the X-direction, in such a manner that the spiral-shaped information track present on the information carrier 1 is scanned by the laser beam 17 of the scanning unit 15. During scanning, information present on the information track can be read by the scanning unit 15 or information can be written on the information track by the scanning unit 15.

Figure 2:
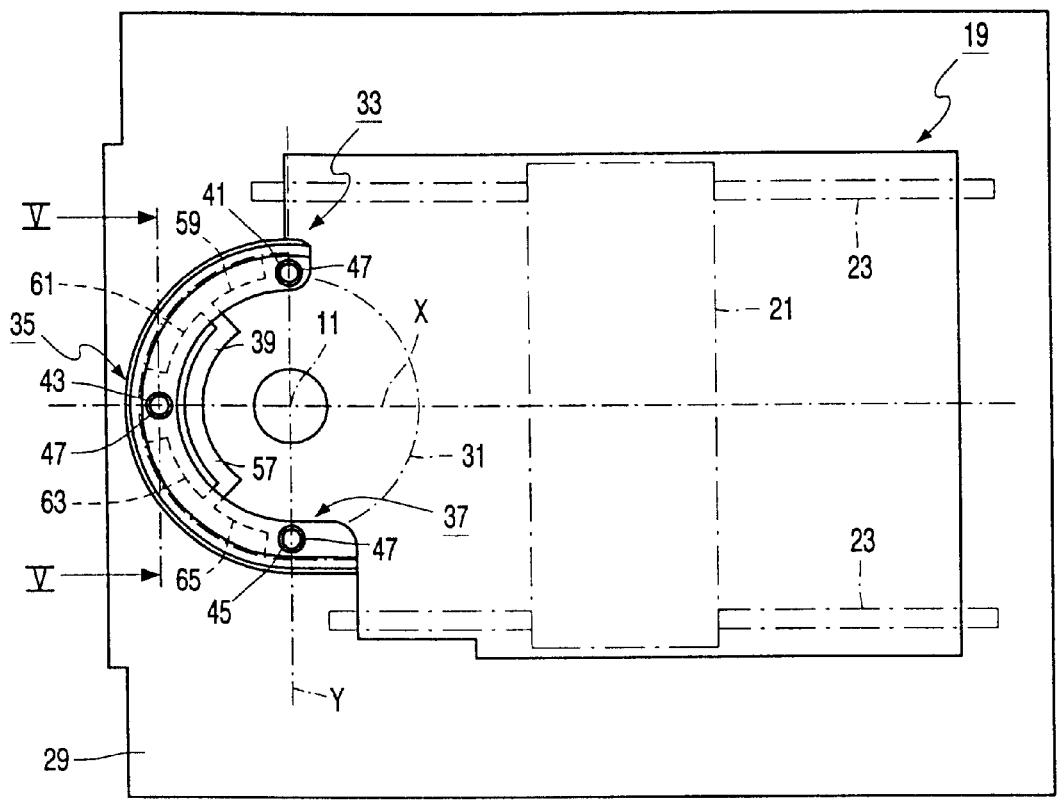
FIG. 2 shows a first frame of the scanning device as shown in FIG. 1.
Figure 3:
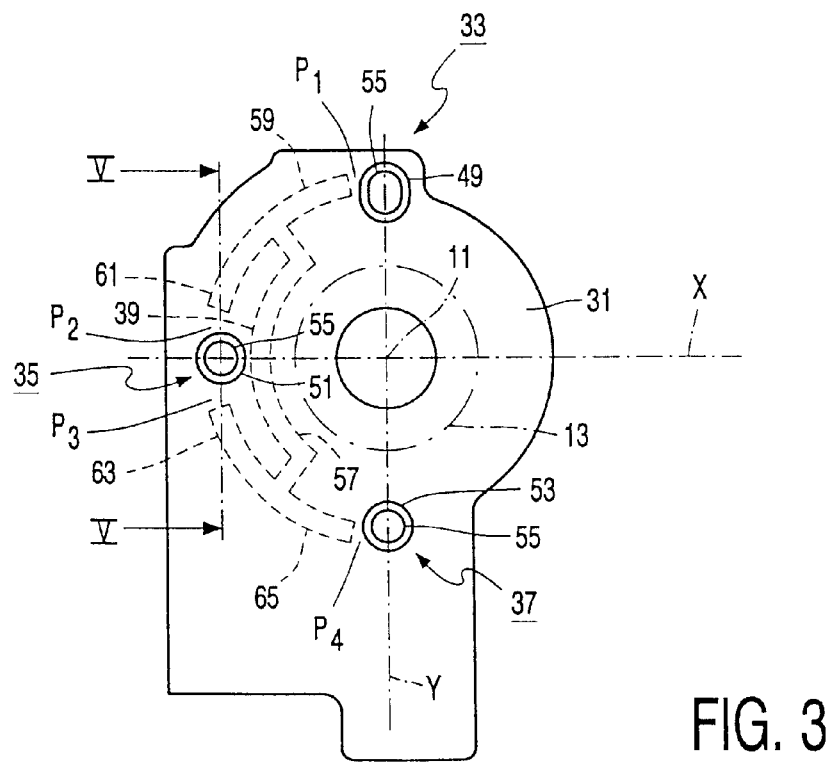
FIG. 3 shows a second frame of the scanning device as shown in FIG. 1.
Figure 4:
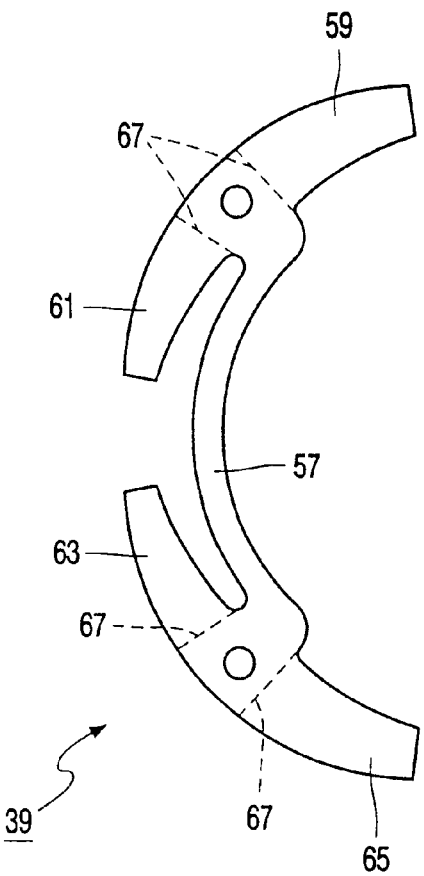
FIG. 4 shows a pretensioning means of the scanning device as shown in FIG. 1.
Figure 5:
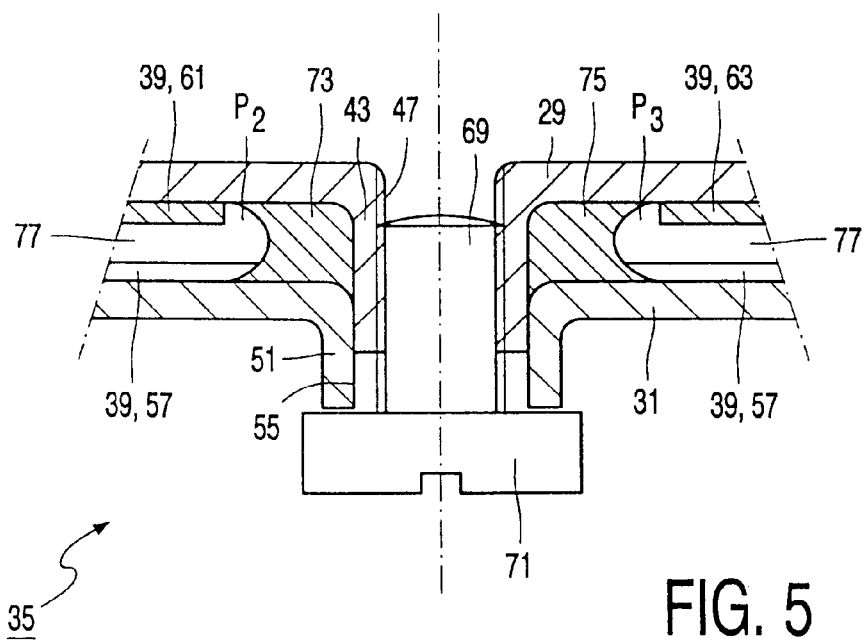
FIG. 5 is a sectional view taken on the lines V—V in FIGS. 2 and 3.

The scanning unit shown in FIG. 1 can suitably be used to scan information carriers having a relatively high information density, such as a DVD. In order to be able to correctly scan such information carriers, an angular deviation between a laser beam path 27, along which the laser beam 17 is directed towards the information carrier 1, and a normal to the information layer 7 of the information carrier 1, should lie within relatively small limiting values. Such an angular deviation develops during the manufacture of the scanning device as a result of manufacturing tolerances. To correct said angular deviation in the course of the manufacturing process, in accordance with the method according to the invention, the displacement device 19 with the scanning unit 15 are attached to a first frame 29, while the motor 13 with the support 9 are attached to a second frame 31. The frames 29 and 31 are only diagrammatically shown in FIG. 1, and are shown in more detail in, respectively, FIGS. 2 and 3. The frames 29 and 31 are both plate-shaped, are arranged at a short distance from each other, and extend both at least substantially perpendicularly to the axis of rotation 11. FIG. 2 shows the first frame 29, viewed from a direction A shown in FIG. 1, the second frame 31 being diagrammatically shown by means of dot and dash lines. In FIG. 2, also the slide 21 and the straight guide 23 of the displacement device 19 are diagrammatically shown by means of dot and dash lines. FIG. 3 shows the second frame 31, viewed from a direction B shown in FIG. 1, but FIG. 3 does not show the first frame 29, while it diagrammatically shows the motor 13 by means of a dot and dash line. The first frame 29 is attached to a housing of the scanning device, which housing is not shown in the Figures, while the second frame 31 is attached to the first frame 29 by means of a first adjusting device 33, a second adjusting device 35, a third adjusting device 37 and a pretensioning means 39, which are provided around the motor 13 during the manufacture of the scanning device and will be described in greater detail hereinafter. The pretensioning means 39 is shown in FIGS. 2 and 3 by means of interrupted lines, and is shown in detail in FIG. 4. FIG. 5 shows a sectional view of the second adjusting device 35. The first adjusting device 33 and the third adjusting device 37 are substantially identical to the second adjusting device 35.

The first, the second and the third adjusting device 33, 35 and 37 comprise, respectively, a first, a second and a third cylindrical guide sleeve 41, 43, 45 which are arranged on the first frame 29 and are each provided with a screw hole 47 extending substantially parallel to the axis of rotation 11. The first, second and third adjusting device 33, 35 and 37 further comprise, respectively, a first, second and third cylindrical supporting element 49, 51, 53 which are provided on the second frame 31 and each comprise a guide channel 55 extending substantially parallel to the axis of rotation 11. The guide sleeves 41, 43, 45 and the supporting elements 49, 51, 53 are provided in, respectively, the first frame 29 and the second frame 31 by means of, for example, a deep-drawing process. As shown in FIG. 5, the supporting elements 49, 51, 53 of the second frame 31 are provided around the guide sleeves 41, 43 45 of the first frame 29 during the assembly of the scanning device, the above-mentioned pretensioning means 39 being provided between the first frame 29 and the second frame 31. As shown in FIGS. 2, 3 and 4, the pretensioning means 39 comprises a mechanical spring with a base part 57 in the form of a ring segment which is placed on the second frame 31 between the second adjusting device 35 and the motor 13 and is attached, preferably, to the second frame 31, and two pairs of elastically deformable strips 59, 61 and 63, 65 which are attached, near both ends of the base part 57, to the base part 57 and are bent about bending lines 67 with respect to base part 57. As shown in FIGS. 2 and 3, the pair of strips 59, 61 is situated, after both frames 29, 31 have been assembled, between the first adjusting device 33 and the second adjusting device 35, while the pair of strips 63, 65 is situated between the second adjusting device 35 and the third adjusting device 37. The adjusting devices 33, 35, 37 further each comprise a screw 69 with a head 71, with which the second frame 31 is attached, after the provision of the pretensioning means 39 between the two frames 29, 31, to the first frame 29. For the sake of simplicity, FIG. 5 only shows the screw 69 of the second adjusting device 35. The screws 69 are provided in the guide channels 55 of the supporting elements 49, 51, 53 and screwed into the screw holes 47 of the guide sleeves 41, 43, 45. As shown in FIG. 5, the screws 69 are screwed in so far that the second frame 31 remains at some distance from the first frame 29. As a result thereof, as shown in FIG. 5 with respect to the strips 61 and 63, the strips 59, 61, 63, 65 engage the first frame 29 under pretension, so that, via the three supporting sleeves 49, 51, 53, the second frame 31 rests against the heads 71 of the screws 69 under the influence of a pretensioning force supplied by the pretensioning means 39, and so that, viewed in a direction parallel to the axis of rotation 11, a distance is maintained between the two frames 29, 31 at the location of the three adjusting devices 33, 35, 37 under the influence of said pretensioning force.

The adjusting devices 33, 35, 37 each form an adjustment position for the mutual orientation of the two frames 29, 31 since the distance between the two frames 29, 31 at the location of the adjusting devices 33, 35, 37 can be adjusted by rotating the screws 69. After the two frames 29, 31 have been assembled, the mutual orientation of the two frames 29, 31 is adjusted by means of the adjusting devices 33, 35, 37 in such a manner that the above-mentioned angular deviation between the laser beam, path 27 and the normal to the information layer 7 of the information carrier 1 is corrected. In the example shown in the Figures, the first adjusting device 33 and the third adjusting device 37 are arranged, on a Y-axis, so as to be diametrically opposed, with respect to the axis of rotation 1, which Y-axis, intersects the axis of rotation 11 at right angles and extends perpendicularly to the X-direction, while the second adjusting device 35 is arranged on a X-axis, which intersects the axis of rotation 11 and the Y-axis at right angles and extends parallel to the X-direction. By rotating the screws 69 of the first adjusting device 33 and the third adjusting device 37 through equal angles, but in opposite directions, the second frame 31 is tilted about the X-axis with respect to the first frame 29. By rotating the screw 69 of the second adjusting device 35, the second frame 31 is tilted about the Y-axis with respect to the first frame 29. Said angular deviation can be corrected by suitably tilting the second frame 31 about the X-axis as well as the Y-axis, the angular deviation being measured with respect to a reference information carrier. In addition, an average distance which, viewed in a direction parallel to the axis of rotation 11, is present between the two frames 29, 31 can be adjusted by rotating the screws of the adjusting devices 33, 35, 37 through equal angles and in the same directions. During adjusting the mutual orientation of the two frames 29, 31, said two frames 29, 31 are guided with respect to each other by means of the guide sleeves 41, 43, 45 of the first frame 29 and the supporting elements 49, 51, 53 of the second frame 31. As a result, the guide sleeves 41, 43, 45 perform two functions, namely guiding the two frames 29, 31 with respect to each other and carrying the screw holes 47. The supporting elements 49, 51, 53 also perform two functions, namely guiding the two frames 29, 31 with respect to each other and making the second frame 31 bear against the heads 71 of the screws 69. In this manner, a very simple and practical construction of the scanning device is obtained. To preclude deformations of the guide sleeves 41, 43, 45, the supporting elements 49, 51, 53 and the screws 69 during mutually tilting the two frames 29, 31, some clearance is provided between the guide sleeves 41, 43, 45 and the supporting elements 49, 51, 53. In the example shown, almost no clearance is provided between the first guide sleeve 41 and the first supporting element 49, viewed in a direction parallel to the X-axis, and, viewed in a direction parallel to the Y-axis, some clearance is provided, with the first supporting element 49 being slightly oval in shape. Viewed in a direction parallel to the X-axis as well as parallel to the Y-axis, some clearance is provided between the second guide sleeve 43 and the second supporting element 51, while there is almost no clearance between the third guide sleeve 45 and the third supporting element 53. It is to be noted, however, that the clearance between the guide sleeves 41, 43, 45 and the supporting elements 49, 51, 53 can also be embodied in a different manner.

According to the method in accordance with the invention, the mutual orientation of the two frames 29, 31 which has been adjusted as described above is secured by curing an adhesive which, during the assembly of both frames 29, 31, is provided in uncured form between the two frames 29, 31 close to the adjusting devices 33, 35, 37. In the example shown, a quantity of adhesive is provided in the interspaces $P_1$, $P_2$, $P_3$ and $P_4$ shown in FIG. 3, which are each present between one of the adjusting devices 33, 35, 37 and the pretensioning means 39. The adhesive may alternatively be provided at other locations between the two frames 29, 31. Preferably, use is made of an adhesive having a relatively long curing time, or an adhesive which can be cured in a controlled manner using, for example, UV-light. This enables the adhesive to be maintained in its uncured form during the assembly operation and during adjusting the mutual orientation of the frames 29, 31, so that the mutual orientation of the frames 29, 31 can be adjusted while deforming the adhesive. The mutual orientation thus adjusted is subsequently secured by curing the adhesive. In FIG. 5, the adhesive in the interspaces $P_2$ and $P_3$ is shown in cured form and is indicated by means of reference numerals 73 and 75, respectively. As shown, the adhesive is provided between the two frames 29, 31 in such a manner that the adhesive is in contact with the first frame 29 as well as the second frame 31 over a substantial part of their surface area. As shown in FIG. 5 for the strips 61 and 63, a receiving space 77 is present between the second frame 31 and each of the strips 59, 61, 63, 65 of the pretensioning means 39, which receiving space 77 can be used to efficiently receive excess adhesive which is forced out of the interspaces $P_1$ and $P_2$, $P_3$ and $P_4$ during adjusting the mutual orientation of the two frames 29, 31.

By providing the adhesive between the two frames 29, 31 and subsequently curing it, a very stable, constrained securing of the adjusted mutual orientation of the two frames 29, 31 is obtained. It is thus precluded that the two frames 29, 31 can be moved relatively to each other counter to the pretensioning force of the pretensioning means 39 during operation of the scanning device. Such displacements could be caused by imbalance forces which, particularly at relatively high rotational speeds of the support 9, are caused by imbalance in the information carrier 1 or the support 9, which displacements are undesirable because they lead to deviations from the adjusted orientation of the laser beam path 27 with respect to the information carrier 1. Such relatively high rotational speeds occur, in particular, during scanning, for example, a CD-ROM or DVD-ROM. By means of the adhesive, a very simple and practical way of securing is obtained. Securing by means of the adhesive requires relatively little time and effort, in particular, in an embodiment of a method in accordance with the invention, wherein an amount of adhesive is also provided in the screw holes 47 of the adjusting devices 33, 35, 37, thereby securing the screws 69 against rotation in the screw holes 47, after adjusting the mutual orientation of the two frames 29, 31, by curing the adhesive provided in the screw holes 47. Preferably, a similar type of adhesive is used between the two frames 29, 31 and in the screw holes 47, so that the provision of the adhesive between the two frames 29, 31, in addition to introducing the adhesive into the screw holes 47, requires a relatively small number of additional operations.

By means of the above-described scanning device, which is manufactured in accordance with a method according to the invention, information can be read from the information layer 7 or information can be written on the information layer 7 during scanning the information carrier 1. It is to be noted that in accordance with a method according to the invention, it is also possible to manufacture scanning devices with which information can only be read from the information layer 7 or information can only be written on the information layer 7.

It is to be noted further that a scanning device in accordance with a method according to the invention can be provided with a type of adjusting device or a type of pretensioning means other than the above-described adjusting devices 33, 35, 37 and pretensioning means 39. For example, the pretensioning means may be a magnetic pretensioning means. The adjusting device may comprise, for example, a first and a second mechanical stop whose interspace can be adjusted and against which, respectively, the first frame and the second frame rest under the influence of the pretensioning force of the pretensioning means.

It is finally to be noted that a scanning device in accordance with a method according to the invention a scanning device can be provided in more or fewer than three adjustment positions, for example a single adjustment position or two adjustment positions, with an adjusting device. Dependent upon a desired freedom of adjustment, the use of a single adjustment position enables both frames to be for example mutually tiltable about a single tilt axis, and when use is made of two adjustment positions they are mutually tiltable, for example, about two mutually perpendicular tilt axes.

What is claimed is:

1. A method of manufacturing a scanning device comprising a support for an information carrier, a motor for rotating the support about an axis of rotation, a scanning unit for scanning the information carrier, and a displacement device for displacing the scanning unit relative to the information carrier, according to which method the motor and the displacement device are each provided on a separate frame, and the scanning device is provided with a pretensioning means and an adjusting device, both frames being maintained at a mutual distance in at least one adjustment position, viewed in a direction parallel to the axis of rotation, under the influence of a pretensioning force of the pretensioning means, and said distance being adjusted by means of the adjusting device, characterized in that an amount of an adhesive is provided between the two frames at a location near the adjusting device, an adjusted distance between the two frames being secured by curing the adhesive provided between the two frames when the two frames are under tension due to said pretensioning means.

2. A method as claimed in claim 1, wherein the amount of adhesive is provided in an interspace between the adjusting device and the pretensioning means.

3. A method as claimed in claim 1, wherein said distance is adjusted by rotating a screw of the adjusting device, which screw is screwed into a screw hole of a first one of the two frames, which screw hole extends substantially parallel to the axis of rotation, and which screw is provided with a head against which a second one of the two frames rests under the influence of the pretensioning force, a further amount of adhesive being provided in the screw hole, and the screw being secured, after adjusting said distance, in the screw hole by curing the adhesive provided in the screw hole.

* * * * *